Figure 1:
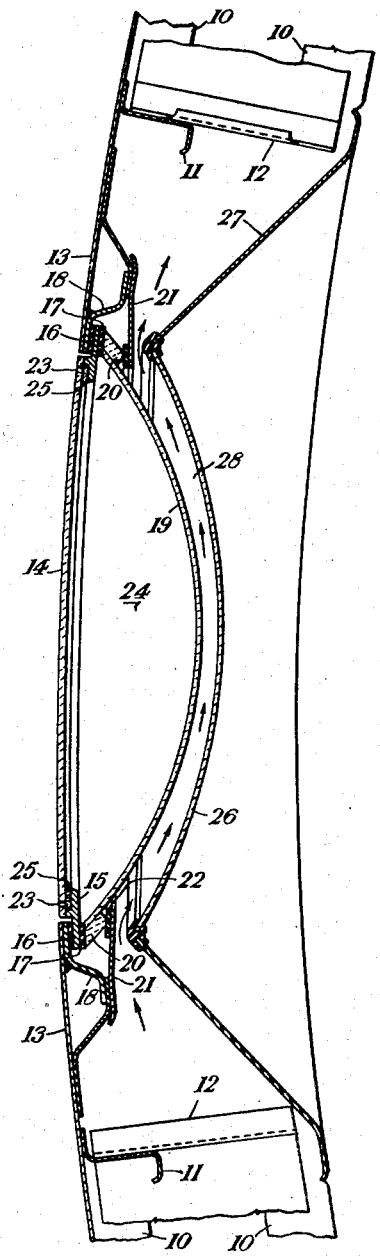

Nov. 20, 1951 — D. J. HARDY — 2,575,757
WINDOW FOR PRESSURIZED CHAMBERS
Filed Jan. 11, 1950 — 3 Sheets-Sheet 1

Inventor
Derek James Hardy
By Moses, Nolte, Crews & Berry
Attorneys

Nov. 20, 1951 D. J. HARDY 2,575,757
WINDOW FOR PRESSURIZED CHAMBERS
Filed Jan. 11, 1950 3 Sheets-Sheet 2

UNITED STATES PATENT OFFICE 2,575,757

WINDOW FOR PRESSURIZED CHAMBERS

Derek James Hardy, Cowes, Isle-of-Wight, England, assignor to Saunders-Roe Limited, Osborne, England Application January 11, 1950, Serial No. 137,980
In Great Britain January 19, 1949

8 Claims. (Cl. 20—40)

It has hitherto been the practice to use relatively flat panels of transparent material, shaped to the form of the body of the cabin, as the portlights or windows in pressurised chambers such as aircraft cabins. These portlights are often made of plastic material, for example the material sold under the British registered trademark "Perspex" and as they have to withstand a large pressure difference at high altitudes, the panel constituting each portlight must be thick. Such panels are supported at their edges by the wall of the cabin and are liable to fatigue as the result of repeated flexure under the differential pressure acting on them under different flying conditions. They are, moreover, subject at altitude to a large temperature gradient and, being thick and of poor thermal conductivity, may shear under this temperature gradient.

Failure of a portlight at altitude, by shearing or as the result of fatigue, may have serious effects on the occupants of the cabin and the object of this invention is to provide an alternative form of portlight which may be made of thinner material, thereby saving in weight and cost, and rendering the panel less likely to failure.

The invention provides in a pressurised aircraft cabin, a portlight fitted to a window opening in the wall of the cabin and comprising an inner domed and preferably part spherical transparent panel, subject to the pressure difference between the exterior and the interior of the cabin and held in position to seal the window opening by the excess pressure within the cabin, and an outer transparent panel flush with the outer skin of the aircraft.

The domed panel may have its convex surface facing inwardly, in which case the material from which the dome is formed will be in compression, or it may have its convex surface facing outwardly, in which case the material will be in tension.

Preferably the rim of the domed panel bears, at or near its rim, against a ring and is free to move thereon, to allow the panel to change its curvature in response to change in the pressure differential between the exterior and interior of the cabin, while maintaining sealing engagement with the ring. As the rim of the domed panel is free to slide in relation to the ring, bending loads induced in the domed panel as the result of the pressure differential will be reduced to a minimum. There will be, however, resultant radial loads to be catered for if, when under pressure, the dome is supported at its rim by a flat or only slight curved surface.

The portlight may include a third transparent domed panel mounted inside the domed panel and spaced therefrom so as to provide a passage for circulation of warm air from the air circulation system within the cabin for the purpose of reducing the transfer of low temperature into the cabin and preventing icing or misting. The third panel also serves to prevent the pressure-resisting domed panel from being damaged by the occupants of the cabin.

It will be understood that the domed panel alone serves to take the stresses due to the pressure differential, the outer panel being relieved from load due to the space between the outer panel and the domed panel being at atmospheric pressure. Breather holes may be provided in the outer panel for allowing access of external air to this space and, by leading the air admitted through the breather holes to the space between the panels along a channel filled with a dehumidifying agent, e. g. silica gel, the tendency for mist to form on the portlight is reduced or eliminated.

A panel of domed form will withstand the same pressure difference as a considerably thicker flat panel of the same material. Thus, in a specific example, a flat panel of Perspex of ⅝" in thickness may be safely replaced by an outer flat Perspex panel ⅛" thick and a domed inner Perspex panel also ⅛" thick. This represents a considerable saving in weight and also in cost. Moreover, the thin domed panel is much less liable to shearing under the temperature gradient than the thicker flat panel. Also, the thin domed panel is not liable to fatigue, since, as noted above, its rim may rest against the sealing ring and slide thereon in response to changes in the pressure difference, or to changes in temperature, so that the bending loads in the panel will be reduced to a minimum.

Due to the reduction in thickness of the material, the portlight according to the invention may be made considerably larger, for a given weight, than an equivalent portlight of the flat panel type. Portlights according to the invention can, therefore, be used as escape hatches by the provision of an appropriate mounting enabling the panels to be knocked out in case of emergency.

Some specific embodiments of portlight according to the invention will now be described in detail, by way of example, with reference to the accompanying drawings, in which—

Figure 2:
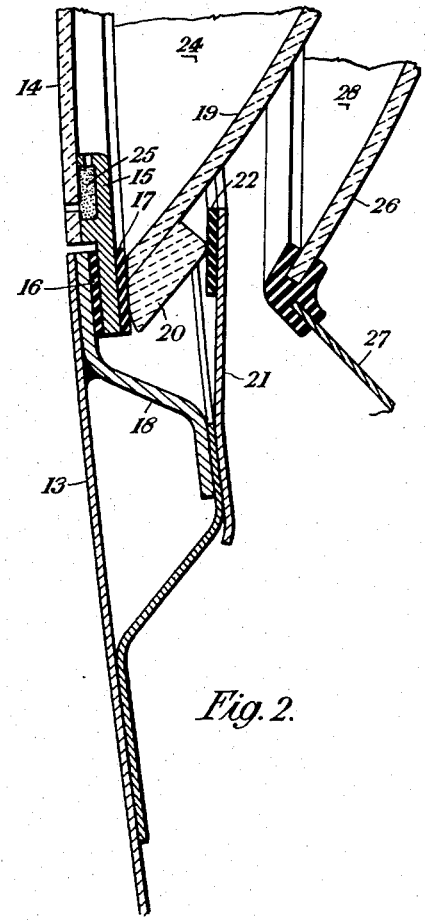
Figure 5:
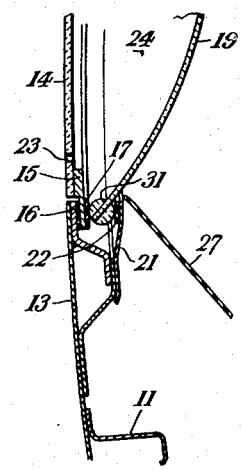
Figure 6:
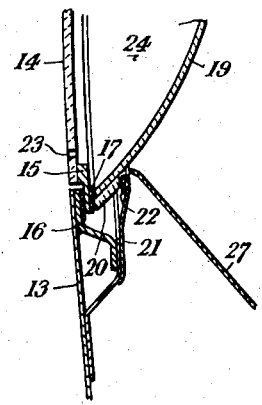
Figure 8:
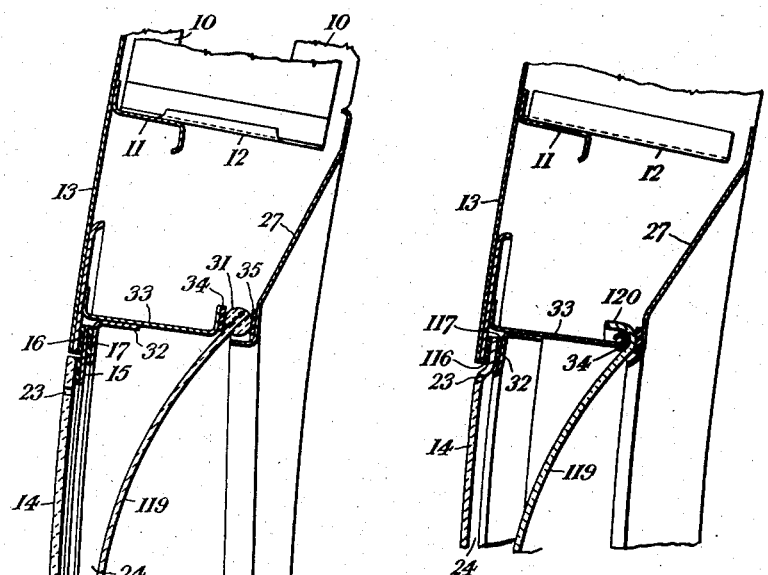
Figures 7, 9:
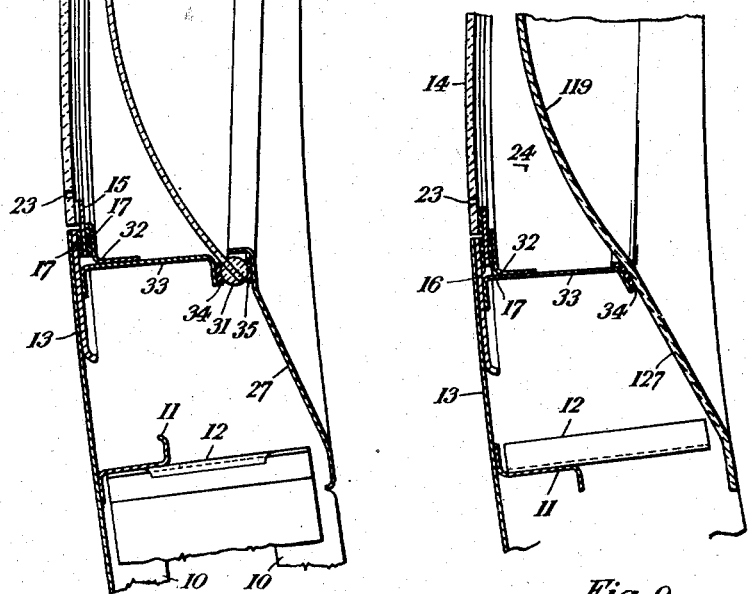

Fig. 1 is a diagrammatic vertical section through one form of domed portlight according to the invention, the domed panel being mounted in compression, Fig. 2 is an enlarged view of part of the portlight shown in Fig. 1, Figs. 3 to 6 are respectively scrap views showing alternative forms of support for a domed panel mounted in compression, Fig. 7 is a view, similar to Fig. 1, but showing a domed panel mounted in tension, and Figs. 8 and 9 are respectively scrap views showing alternative forms of support for a domed panel mounted in tension.

Like reference numerals designate like parts throughout the figures.

Referring first of all to Figures 1 and 2, the pressure cabin is built up of hoop-members or frames 10, which pass on either side of the window opening, and longitudinal stringers 11. A member 12 builds up the stringers 11 locally to the same height as the frames 10, forming a square structure round the circular opening cut in the cabin skin 13. A circular member 18 reinforces the edge of this opening and forms the seating for a bezel 15. This bezel carries at its rim a pair of rubber sealing rings 16 and 17 and to it is cemented a circular panel 14 of Perspex ⅛" thick, which is flush with the skin 13.

A part-spherical inwardly convex Perspex panel 19, ⅛" thick, having a thickened rim 20, is held by the excess pressure in the cabin in sealing engagement with the ring 17, and is located in position by a metal retaining ring 21 carrying a rubber sealing ring 22.

The outer panel 14 is not a load bearing panel, and has breather holes 23 by which atmospheric air can gain access to the space 24 between the panels 14, 19. Air entering the breather holes 23 passes to the space 24 through a packing 25 of silica gel accommodated in an annular groove in the bezel 15.

The whole of the load due to the pressure differential between the exterior and interior of the cabin is taken in compression by the domed panel 19. The excess pressure within the cabin holds the rim 20 of the domed panel 19 in firm engagement with the rubber sealing ring 17, but the rim of the domed panel can slide on the rubber sealing ring to enable the panel to change shape slightly in response to changes in the pressure or temperature difference to which it is exposed.

A third Perspex panel 26, ⅛" thick, is mounted inside the domed panel 19, being supported on a conical fairing 27, and provides a duct 28 through which warm air may be circulated between the panels 19, 26 as already mentioned.

Figure 3:
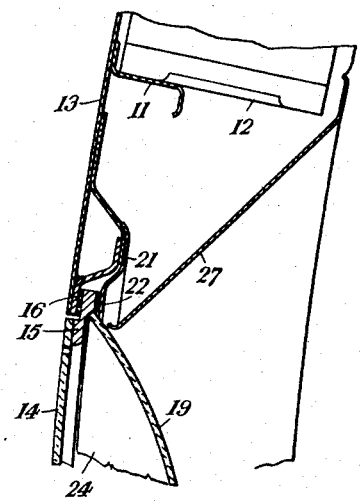

In the construction shown in Fig. 3, the rim of the domed panel 19 is not thickened, and bears directly against a formed surface on the bezel 15, no intermediate rubber sealing ring being provided. The load on the domed panel has a component radial to the outer panel 14, which is taken on the bezel 15.

Figure 4:
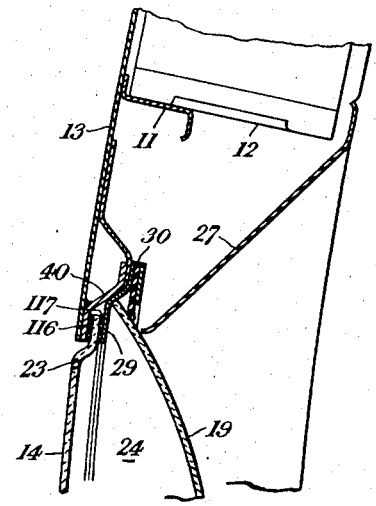

In the construction shown in Fig. 4, the rim of the domed panel 19 bears against a sloping surface of a ring 29 which extends in the direction normal to the edge of the panel, change in curvature of the panel 19 being permitted as its edge can slide along the sloping surface of the ring 29. An annular rubber sealing strip 30 is provided inside the panel 19. In this case there is no bezel, the rim of the outer panel 14 being inwardly joggled and received between rubber sealing strips 116, 117 carried respectively by a member 40 and by the ring 29.

The construction of Fig. 5 is very similar to that of Fig. 1. The rim of the domed panel 19 is, however, formed with a bead 31 of circular section. Also, the bezel 15 is of different shape. Fig. 6 shows an arrangement generally similar to that of Fig. 1, but the bezel is of the different shape shown in Fig. 5.

The construction shown in Fig. 7 differs from that in Fig. 1 in that the inner domed panel 119 is convex outwardly and therefore mounted in tension. The bezel 15, carrying the outer panel 14, is supported by an annular bracket 32 on a pressure tight metal ring 33, mounted coaxially with the window opening and carrying a rubber sealing ring 34 against which the bead 31 at the rim of the panel 119 is held by the pressure inside the cabin. The fairing 27 carries a rubber sealing ring 35 which abuts against the inner face of the bead 31. As before, the panel 119 can change its curvature, in response to changes in the pressure differential, the bead 119 sliding on the sealing ring 34 to allow of this.

In Fig. 8, the bezel is omitted, the rim of the outer panel being inwardly joggled, as in the case of Fig. 4, and received between rubber sealing strips 116, 117. The rim 120 of the domed panel 119 is outwardly bent and hooked over the sealing ring 34 carried by the pressure tight ring 33.

The construction of Fig. 9 differs from that of Fig. 7 mainly in that the conical metal fairing 27 is omitted, and replaced by an extension 127 of the domed panel 119.

Although no third and innermost panel, such as the panel 26 of Fig. 1, has been shown in the constructions of Figs. 3–9, such an innermost panel can, if desired, be provided in these cases. Also, provision can be made in the constructions of Figs. 3–9 for conducting the air admitted through the breather holes 23 to the space 24 through a channel containing silica gel.

What I claim as my invention and desire to secure by Letters Patent is:

1. A pressurisable aircraft cabin, having a wall and comprising a window opening in said wall, a thin substantially flat outer transparent panel mounted in said opening with its outer surface flush with the outer surface of said wall, a thin domed inner transparent panel, means for supporting said inner panel with its central portion spaced from said outer panel and with its rim free to move, and window sealing means adjacent the rim of said inner panel, said outer panel allowing access of atmospheric air to the space between said panels and said inner panel being held by the excess pressure within the cabin, when said cabin is at altitude, in position to seal said window opening.

2. A pressurisable aircraft cabin, having a wall and comprising a window opening in said wall, a thin substantially flat outer transparent panel mounted in said opening with its outer surface flush with the outer surface of said wall, a thin part spherical inner transparent panel, means for supporting said inner panel with its central portion spaced from said outer panel and with its rim free to move, and window sealing means adjacent the rim of said inner panel, said outer panel allowing access of atmospheric air to the space between said panels and said inner panel being held by the excess pressure within the cabin, when said cabin is at altitude, in position to seal said window opening.

3. A pressurisable aircraft cabin, having a wall and comprising a window opening in said wall, a thin substantially flat outer transparent panel mounted in said opening with its outer surface flush with the outer surface of said wall, a thin domed inner transparent panel, a ring surrounding said window opening at the inside thereof and means supporting said inner panel with its central portion spaced from said outer panel and with its rim engaging but free to slide on said ring, said outer panel allowing access of atmospheric air to the space between said panels and said inner panel being held by the excess pressure within the cabin, when said cabin is at altitude, with its rim in sealing engagement with said ring.

4. A pressurisable aircraft cabin, having a wall and comprising a window opening in said wall, a member in said wall surrounding the window opening, a thin substantially flat outer transparent panel fitted to the outside of said member with its outer surface flush with the outer surface of said wall, said outer panel having a breather hole therein, a thin inwardly convex domed inner transparent panel having its convex surface exposed to the pressure within the cabin, means supporting said inner panel with its central portion spaced from said outer panel and with its rim adjacent and movable in relation to said member, and a sealing ring disposed between the rim of said inner panel and said member.

5. An aircraft cabin as claimed in claim 4, wherein the means supporting said inner panel comprises a retaining ring disposed inside the window frame and a sealing ring carried by said retaining ring and bearing against the inner face of said inner panel.

6. A pressurisable aircraft cabin, having a wall and comprising a window opening in said wall, a thin substantially flat outer transparent panel mounted in said opening with its outer surface flush with the outer surface of said wall, a thin domed inner transparent panel, means for supporting said inner panel with its central portion spaced from said outer panel and with its rim free to move, window sealing means adjacent the rim of said inner panel, said outer panel allowing access of atmospheric air to the space between said panels and said inner panel being held by the excess pressure within the cabin, when said cabin is at altitude, in position to seal said window opening, a third transparent panel, and means supporting said third panel in position spaced inwardly from said inner domed panel.

7. A pressurisable aircraft cabin, having a wall and comprising a window opening in said wall, a member in said wall surrounding the window opening, a thin substantially flat outer transparent panel fitted to the outside of said member with its outer surface flush with the outer surface of said wall, said outer panel allowing atmospheric air to pass to the inner face thereof, a pressure tight ring surrounding said window opening and extending rearwardly therefrom, a thin outwardly convex domed inner transparent panel having its concave surface exposed to the pressure within the cabin, means supporting said inner panel spaced from said outer panel and with its rim adjacent and movable in relation to the inner edge of said pressure tight ring and a sealing ring disposed between the rim of said inner panel and the inner edge of said pressure tight ring.

8. An aircraft cabin as claimed in claim 7, wherein the means supporting said inner panel comprises a retaining ring disposed inside the window frame and a sealing ring carried by said retaining ring and bearing against the inner face of said inner panel.

DEREK JAMES HARDY.

REFERENCES CITED

The following references are of record in the file of this patent:

UNITED STATES PATENTS

| Number | Name | Date |
|---|---|---|
| 1,913,703 | D'Adrian | June 13, 1933 |
| 2,023,332 | Malivert | Dec. 3, 1935 |
| 2,394,176 | Hillebrand | Feb. 5, 1946 |